United States Patent
Needham

(10) Patent No.: US 10,134,188 B2
(45) Date of Patent: Nov. 20, 2018

(54) BODY-CENTRIC MOBILE POINT-OF-VIEW AUGMENTED AND VIRTUAL REALITY

(71) Applicant: Intel Corporation, Santa Clara, CA (US)

(72) Inventor: Bradford H. Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 14/976,428

(22) Filed: Dec. 21, 2015

(65) Prior Publication Data

US 2017/0178364 A1    Jun. 22, 2017

(51) Int. Cl.
   *G09G 5/12*    (2006.01)
   *G06T 19/00*   (2011.01)

(52) U.S. Cl.
   CPC .... *G06T 19/006* (2013.01); *G06F 2200/1614* (2013.01)

(58) Field of Classification Search
   CPC .................................................. G06F 1/1694
   USPC ......................................................... 345/633
   See application file for complete search history.

(56) References Cited

U.S. PATENT DOCUMENTS

| | | | | |
|---|---|---|---|---|
| 5,481,622 A * | 1/1996 | Gerhardt | ................ | A61B 3/113 345/158 |
| 5,622,170 A * | 4/1997 | Schulz | ................ | A61B 5/0064 356/141.1 |
| 7,626,569 B2 * | 12/2009 | Lanier | ................... | G06F 1/1601 345/156 |
| 8,502,864 B1 * | 8/2013 | Watkins | ................ | G03B 35/00 348/52 |
| 8,933,965 B2 * | 1/2015 | Tomite | ................... | G06T 15/50 345/633 |
| 2004/0061831 A1 * | 4/2004 | Aughey | ................ | A61B 3/113 351/209 |
| 2011/0081045 A1 * | 4/2011 | Lee | .................... | G06K 9/00362 382/103 |
| 2011/0248987 A1 * | 10/2011 | Mitchell | ................ | G06T 15/20 345/419 |
| 2011/0273369 A1 * | 11/2011 | Imai | ....................... | G06T 15/20 345/158 |
| 2012/0113143 A1 | 5/2012 | Adhikari et al. | | |
| 2012/0235893 A1 * | 9/2012 | Phillips | .................. | G06F 3/012 345/156 |

(Continued)

OTHER PUBLICATIONS

"International Application Serial No. PCT/US2016/062727, International Search Report dated Feb. 24, 2017", 4 pgs.

(Continued)

*Primary Examiner* — Javid A Amini
(74) *Attorney, Agent, or Firm* — Schwegman Lundberg & Woessner, P.A.

(57) ABSTRACT

Embodiments of a system and methods for displaying virtual or augmented reality are generally described herein. An image of a user may be captured using a camera. Real space in the image may be mapped and a first orientation may be determined relative to a static portion of the user, using the image. A first portion of a virtual reality image may be displayed on a display screen. In response to determining a second orientation of the device relative to the static portion of the user, a second portion of the virtual reality image may be displayed on a display screen.

24 Claims, 6 Drawing Sheets

(56) References Cited

U.S. PATENT DOCUMENTS

| | | |
|---|---|---|
| 2012/0249741 A1 | 10/2012 | Maciocci et al. |
| 2012/0259638 A1* | 10/2012 | Kalinli .................... G10L 15/25 704/270 |
| 2013/0021373 A1* | 1/2013 | Vaught ................. G02B 27/017 345/633 |
| 2013/0135196 A1* | 5/2013 | Park .......................... G06F 3/01 345/156 |
| 2013/0181892 A1* | 7/2013 | Liimatainen ............ G06F 3/011 345/156 |
| 2013/0201305 A1* | 8/2013 | Sibecas ............ H04N 21/42201 348/54 |
| 2013/0260360 A1* | 10/2013 | Baurmann ................ G06F 3/14 434/365 |
| 2013/0326364 A1 | 12/2013 | Latta et al. |
| 2014/0267012 A1* | 9/2014 | Mullins ................... G06F 3/013 345/156 |
| 2014/0333735 A1* | 11/2014 | Bathiche ............ H04N 13/0404 348/54 |
| 2014/0347390 A1* | 11/2014 | Poulos ................. G06T 19/006 345/633 |
| 2015/0002392 A1* | 1/2015 | Kempinski ............ A61B 3/113 345/156 |
| 2015/0085076 A1* | 3/2015 | Lockhart ............ H04N 13/0468 348/46 |
| 2015/0085251 A1* | 3/2015 | Larsen ............... G06K 9/00604 351/206 |
| 2015/0235632 A1* | 8/2015 | Liu .......................... G09G 5/38 345/633 |
| 2015/0317831 A1 | 11/2015 | Ebstyne et al. |
| 2015/0362998 A1* | 12/2015 | Park ........................ G06F 3/017 345/173 |
| 2016/0078680 A1* | 3/2016 | Reif ..................... G06T 7/0044 345/633 |
| 2016/0182877 A1* | 6/2016 | Deluca ............... H04N 13/0007 348/53 |
| 2016/0328998 A1* | 11/2016 | Pedersen ................ G09B 23/28 |
| 2016/0331263 A1* | 11/2016 | Cailler ............... A61B 5/04085 |
| 2017/0124760 A1* | 5/2017 | Murakawa ............. G06T 17/20 |
| 2017/0161573 A1* | 6/2017 | Zhao .................... B60W 40/06 |
| 2017/0169659 A1* | 6/2017 | Froy .................. G07F 17/3227 |

OTHER PUBLICATIONS

"International Application Serial No. PCT/US2016/062727, Written Opinion dated Feb. 24, 2017", 8 pgs.

* cited by examiner

BODY-CENTRIC MOBILE POINT-OF-VIEW AUGMENTED AND VIRTUAL REALITY

BACKGROUND

Augmented reality and virtual reality are two types of experiences where a user sees synthetic images. In virtual reality, the user's view is completely synthetic. In augmented reality, a synthetic overlay is placed on top of a view of reality. Augmented reality may be a blending of virtual reality and reality.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods that display augmented reality and virtual reality show a user images that are different from camera images. In virtual reality, the images that are shown to a user are completely immersive and include no aspect of what a device would display using a camera. In augmented reality, an image displayed may include camera images aspects and virtual aspects. In both augmented and virtual reality, a three-dimensional (3D) model may be oriented either to the Earth, such as via accelerometers and magnetometers, or to a specific object, such as a magazine cover (e.g., using simultaneous location and mapping (SLAM)).

Figure 1:
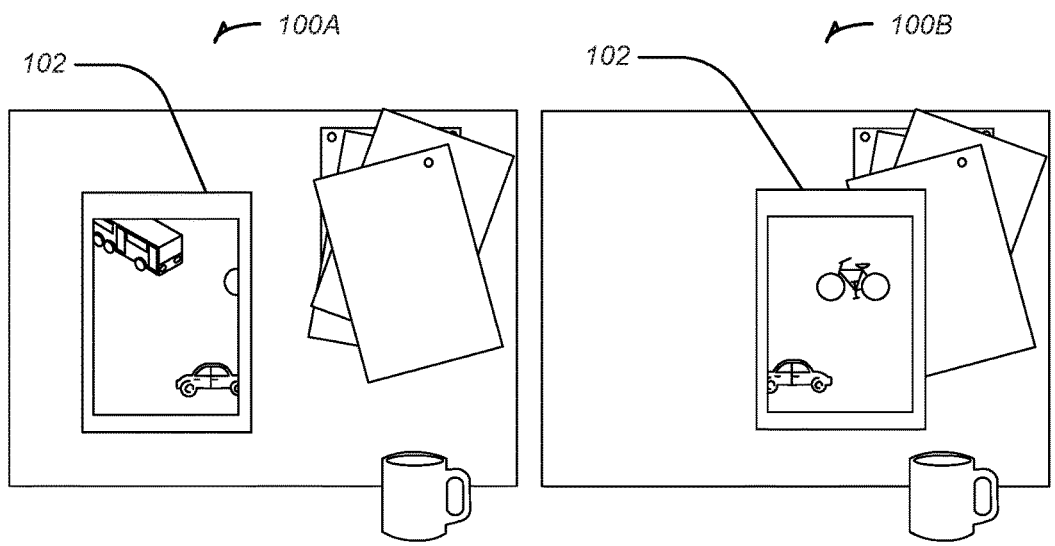
FIG. 1 illustrates an environment including a device for displaying a virtual or augmented reality scene according to an alignment with the Earth in accordance with some embodiments.

FIG. 1 illustrates an environment 100A-B including a device 102 for displaying a virtual or augmented reality scene according to an alignment with the Earth in accordance with some embodiments. The device 102 is shown in a first orientation in environment 100A and the same device 102 is shown in a second orientation in environment 100B. The scene displayed on the device 102 in environments 100A and 100B are both portions of a larger scene, and as the device 102 moves from environment 100A to environment 100B, the device 102 changes the visible portion of the scene. For example, in environment 100A, the device 102 shows a bicycle in full, and in environment 100B, the device 102 shows just the front wheel of the bicycle. In the examples shown in FIG. 1, the vehicles may be static to illustrate the change in location of the device 102 from the left side of the environment 100A to the middle of the environment 100B. In an example, environments 100A-B may include a cubicle wall and the scene displayed on the device 102 may include an outside view.

In an example, the device 102 may include a mobile device, such as a phone or tablet to display virtual reality. The mobile device may include a display showing a portion of a 3D model. Current techniques include basing the virtual reality orientation on the orientation of the mobile device relative to the Earth. For example, as a user points the mobile device in various directions, the mobile device behaves as if it was a window into the corresponding 3D model, as shown in environments 100A-B. The mobile device may use an accelerometer and magnetometer (e.g. a 3D compass) to measure orientation relative to the Earth.

Figure 2:
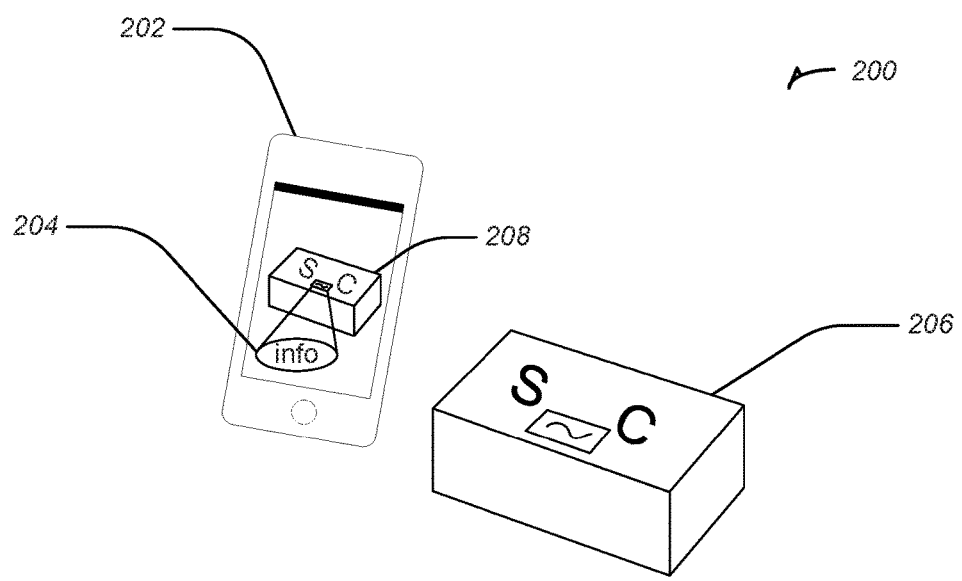
FIG. 2 illustrates an environment including a device for displaying an object-based augmented reality scene in accordance with some embodiments.

FIG. 2 illustrates an environment 200 including a device 202 for displaying an object-based augmented reality scene in accordance with some embodiments. Device 202 may include an image capture device to capture an image of box 206. The image of box 206 is displayed on the device 202 including a virtual representation 208 of box 206. Augmented reality aspects may be added to the image, including augmented image 204. As seen in environment 200, the augmented image 204 appears on a screen of the device 202 without appearing in reality, and the box 206 appears in reality and as a virtual representation 208 on the screen. In conventional augmented reality, virtual elements are shown relative to a target physical object (e.g., box 206). As the device 202 is moved relative to the object or the object is moved relative to the device 202, the augmented image 204 may move as if it is attached to the box 206.

Although these technologies (the virtual reality orientation relative to the Earth of FIG. 1, and the augmented reality orientation relative to a physical object of FIG. 2) work fine for a stationary user or device, they break down for mobile users or mobile devices. The first technique of FIG. 1 fails to adequately function when a device is located in a moving vehicle because as the vehicle turns, so does the virtual reality model, which is disorienting and undesired. Both techniques fail for a device held by a walking user. For a walking user, accelerometers in the device fail to orient the model correctly because the user is moving, and especially when turning, the model moves and turns as well, which may be undesired. In another example, virtual or augmented reality may fail entirely for a user on the move due to difficulties in finding an external physical object that remains fixed to orient to. For example, a system using SLAM with an orientation to the Earth or an external physical object may fail because there is no external physical object that remains fixed relative to the moving and turning user.

In an example, another current technique for displaying virtual reality or augmented reality requires the user to keep a camera of a display pointed at a given real object, such as a magazine cover, product, paper, etc., to see the 3D model. This technique orients the device to the real object, but fails when the camera is moved away from the object.

Figure 3:
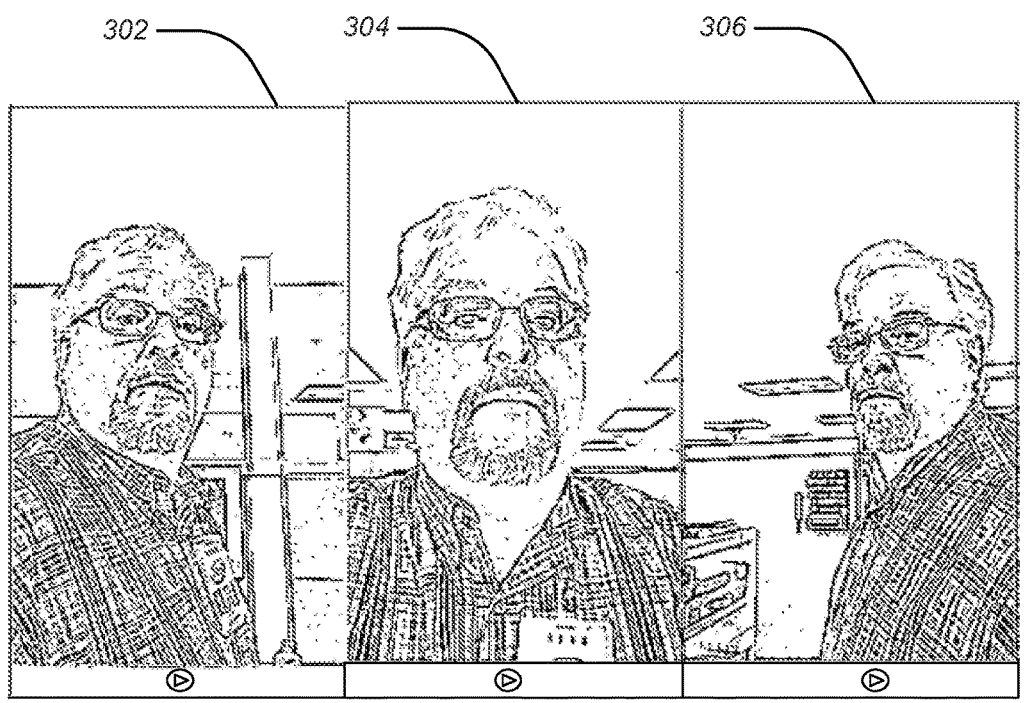
FIG. 3 illustrates images of a user in different orientations relative to an image capture device in accordance with some embodiments.

FIG. 3 illustrates images 302-306 of a user in different orientations relative to an image capture device in accordance with some embodiments. Images 302-306 include a user pointing his head towards a camera with three different orientations of the user's torso, where image 302 includes a first torso orientation, image 304 includes a second torso orientation, and image 306 includes a third torso orientation. As seen in images 302-306, simply orienting to a user's head will cause an undesired change because the user turns his head toward the display as he moves the device from images 302-306. The user points his face toward the device as he moves the display.

In another example, a head-mounted display such as one using goggles may enable a user to view different parts of a virtual or augmented reality model when the user turns his or her head, in an immersive video experience. However, the goggles would be unable to support a system where a user experience is desired that allows a user to move his or her head without altering the virtual or augmented reality content. In yet another example, navigating a virtual or augmented reality model on a small screen may be done using explicit touch commands (e.g., swipe up/down, left/right) to move the virtual or augmented reality model. This technique orients the virtual or augmented reality model to a device display, but requires user interaction that causes the technique to not be seamless.

Figure 4:
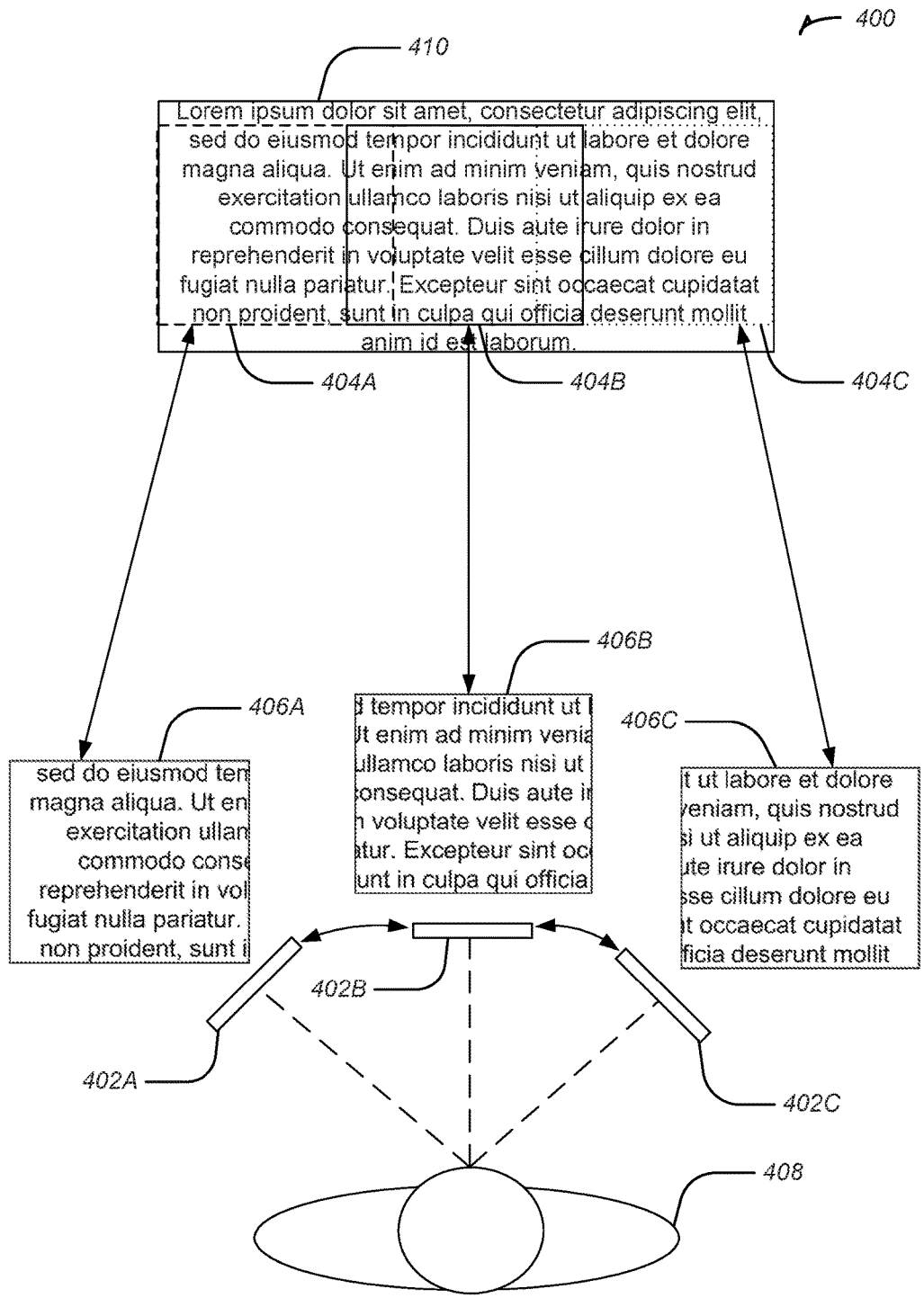
FIG. 4 illustrates a user-oriented virtual or augmented reality display system in accordance with some embodiments.

FIG. 4 illustrates a user-oriented virtual or augmented reality display system 400 in accordance with some embodiments. The display system 400 includes a non-immersive, dual-reality virtual or augmented reality experience, where a user may move his or her head about in the real world while simultaneously moving a device to see different parts of a corresponding virtual or augmented reality scene. In an example, the display system 400 may be used by a user while moving (e.g., walking, running, moving in a vehicle, turning, etc.).

As discussed above, the two common methods of orienting a virtual or augmented reality model to the Earth or to the immediate surroundings fail when a person is moving. The display system 400 successfully orients a virtual or augmented reality model to a static portion of a user, such as the user's torso, while the user is moving. In an example, the display system 400 provides a naturalistic movement (e.g., seamless in a predictable way) to view different parts of a virtual or augmented reality model. For example, a user may move a display device to various positions, such as a first position 402A, a second position 402B, and a third position 402C, to view the different parts of the virtual or augmented reality model.

The display system 400 includes a new type of virtual or augmented reality experience where the 3D model may behave as if it is fastened to a static portion of the user (e.g., the user's torso, waist, shoulders, or the like), rather than the physical Earth or an external physical object. This type of virtual or augmented reality enables the user to move in the physical world while independently and simultaneously navigating the virtual or augmented reality view. Unlike Earth-oriented or physical-object-oriented virtual or augmented reality, the virtual or augmented reality shown in the display system 400 is useful for fully-mobile interactive experiences.

A technique used with the display system 400 includes orienting the virtual or augmented reality model to a static portion of a user's body, such as a torso, rather than to the user's head. The technique may include, for example, performing SLAM on the user's torso via a self-facing camera (e.g., a 3D camera, a depth camera, a wide angle lens camera, multiple cameras, or the like). The display system 400 shows the user 408 with a static portion pointing forward (e.g., towards the second position 402B), when the device is in any of the three positions 402A-C. The user 408 may turn his or her head to see the device in the first position 402A or the third position 402C, but the torso of the user 408 remains static. Viewed from above, the display system 400 includes a view of the user 408 with the torso unmoved while the head turns toward the moving display in each of the three positions 402A-C.

Orienting the virtual or augmented reality model to the torso of the user 408 allows a mobile device to be used as a virtual or augmented reality interface to the model while in motion. For example, the user 408 may reliably move the device to view and interact with (e.g., touch) a part of a larger image or model that remains fixed relative to the torso of the user 408. The display system 400 includes an example model 410 including a large amount of text, unsuitable for display on a device. The user 408 may move the device among various positions (e.g., the three positions shown 402A-C) to view other portions of the model 410. For example, at the first position 402A, a segment of the model 410 is displayed on the device, as shown on a first example display 406A. The first example display 406A is based on a segment of the model 410, represented by box 404A. Similarly, at the second position 402B and at the third position 402C, a second example display 406B corresponding to a box 404B and a third example display 406C corresponding to a box 404C respectively, may be displayed on the device. As the user 408 moves the device from the first position 402A to the second position 402B, for example, the box 404A may slide to the position of box 404B, and the first example display 406A may transition a representation of the sliding box 404A until the second position 402B is reached. The display is not limited to horizontal movement. In an example, vertical movement by the device to various positions may be used to view different portions of the model 410. In another example, the model 410 may be a 3D model, and the virtual or augmented reality model may include a depth portion. The device may move toward or away from the user 408 to change the depth of the virtual or augmented reality model viewed on the device. The movements may be combined so that a fluid movement of the device in 3D space by the user 408 may result in a fluid change to the virtual or augmented reality model displayed on a screen of the device.

In an example, the user 408 may be a doctor walking through labyrinthine halls of a hospital while simultaneously interacting with a large patient-status board using a phone, such as a board too large to display legibly in its entirety on the doctor's phone. Using the display system 400, the doctor may view part of the left side of the board by swinging the phone to the left, and may view part of the right side of the board by swinging the phone to the right (e.g., the left portion of the board may correspond with the box 404A, displayed at the first position 402A, and the right portion of the board may correspond with the box 404C displayed at the third position 402C). Similarly, the doctor may view higher or lower parts of the board by raising or lowering the phone. The board may remain fixed with respect to the torso of the doctor, unaffected by the doctor walking or turning corners.

As the user 408 moves the display, the display system 400 may continuously re-infer the orientation of the display to the static body part of the user 408 (e.g., torso). The device may display the virtual or augmented reality scene from the corresponding camera position and orientation.

Figure 5:
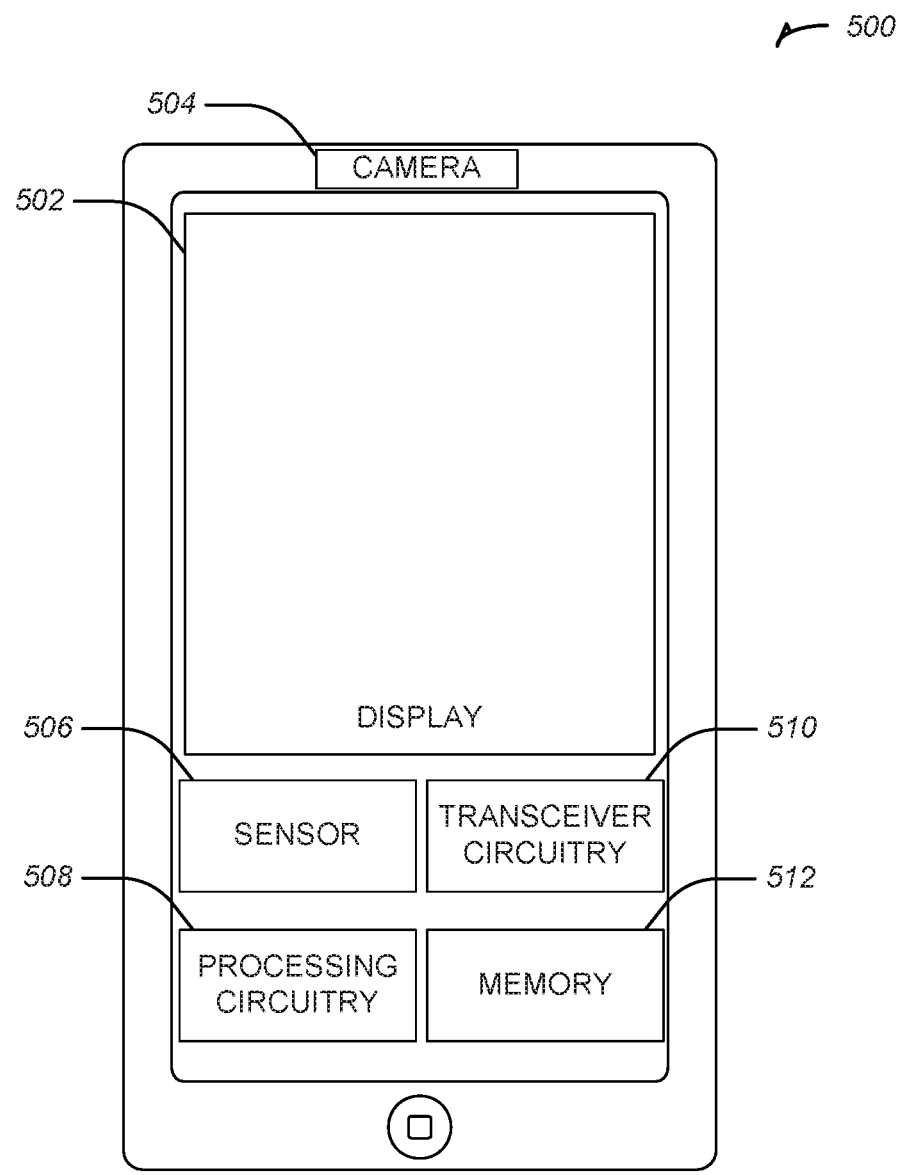
FIG. 5 illustrates a device for displaying virtual or augmented reality in accordance with some embodiments.

FIG. 5 illustrates a device 500 for displaying virtual or augmented reality in accordance with some embodiments. The device 500 includes a display 502 and a camera 504. In the example shown in FIG. 5, the device 500 includes optional components, such as a sensor 506 or sensors (e.g., an accelerometer, a gyroscope, a magnetometer, a global positioning system (GPS) sensor, etc.), processing circuitry 508, transceiver circuitry 510, and memory 512.

In an example, the sensor 506 or the camera 504 on the device 500 may be used to determine the orientation of the device 500 to a static portion of a user, such as a torso, waist, leg(s), or feet of the user. For example, the camera 504 may include a self-facing camera on the display. The device 500 may use the processing circuitry 508 to determine from the output of the camera 504 that the orientation of the camera 504 to landmarks on a static portion of the user (e.g., the torso, the location of the user's shoulders and the plane of their chest). In another example, the camera 504 may include a self-facing, conventional camera and the device 500 may use the processing circuitry 508 to map and locate the torso of the user using a SLAM technique that simultaneously maps the user's torso and calculates the location and orientation of the camera 504 relative to that torso. The device may use the processing circuitry 508 to display, on the display 502, the appropriate part of the virtual or augmented reality scene, based on the orientation of the camera 504 to the user (e.g., to the torso of the user). In an example, the virtual or augmented reality scene, or a portion of the scene, may be received at the device 500 using the transceiver circuitry 510, such as from a server, and stored using the memory 512. In another example, the transceiver circuitry 510 may be used to continuously receive a virtual or augmented reality scene, (e.g., once each millisecond). In yet another example, for an augmented reality scene, the processing circuitry 508 may be used to combine information received by the transceiver circuitry 510 or stored in memory 512 with images taken by the camera 504. The virtual or augmented reality scenes described above (or a portion of one of the scenes) may be displayed using the display 502 of the device 500.

Figure 6:
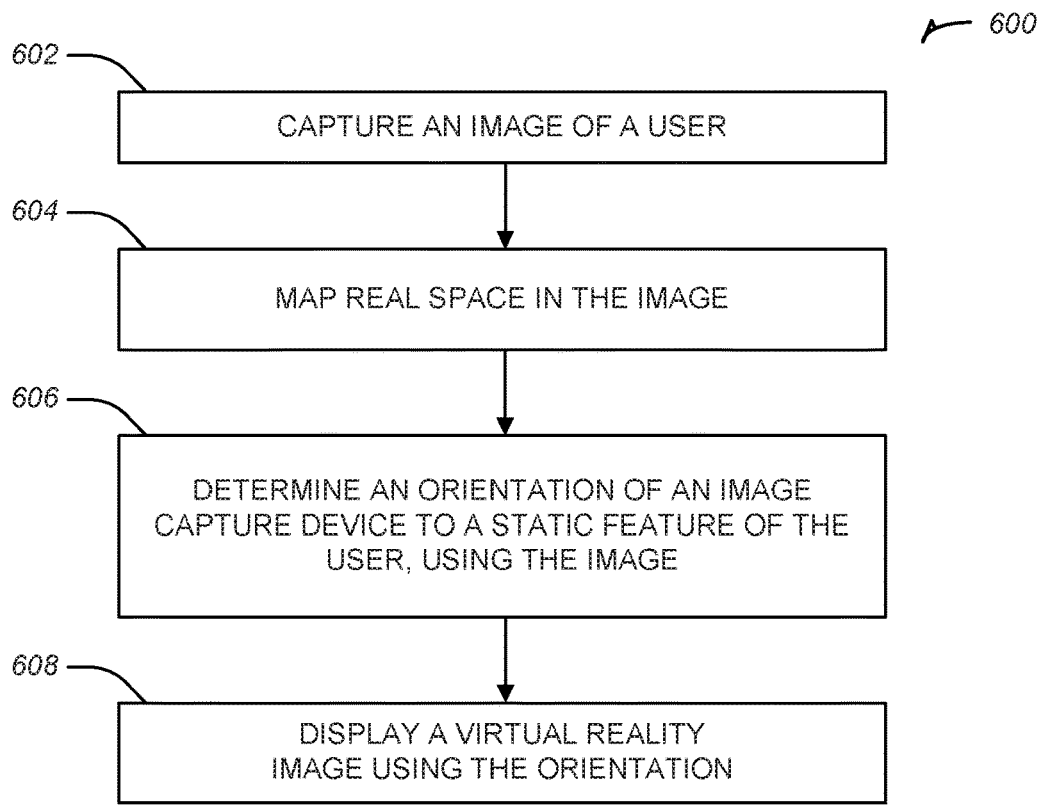
FIG. 6 illustrates generally a flowchart showing a technique for displaying virtual reality in accordance with some embodiments.

FIG. 6 illustrates generally a flowchart showing a technique 600 for displaying virtual reality in accordance with some embodiments. The technique 600 includes an operation 602 to capture an image of a user. To capture the image, the technique 600 may use a camera of a device, such as a mobile device (e.g., a mobile phone, a tablet, a laptop, virtual or augmented reality goggles, virtual or augmented reality glasses, or the like). In the examples using virtual or augmented reality glasses or goggles, additional sensors may be used to determine an orientation of the head of the user to a static portion of the user. For example, multiple cameras may be used to determine the position of the head relative to the static portion of the user. In another example, a camera looking down from the goggles or glasses to the torso may be used. For example, a QR code, barcode, infrared sensor, or other machine-readable identifying mark may be placed on the static portion of the user. In yet another example, by predetermining the kinematics of the head or neck against the torso, the relative orientation may be determined. In still another example, a body sensor may be used to determine a relative orientation, such as an accelerometer, a gyroscope, GPS sensor, etc. The camera used to capture the image may include a 3D camera, a wide-angle camera, a depth camera, etc. The technique 600 includes an operation 604 to map real space in the image. To map real space in the image, the operation 604 may map real space that is visible to the camera. In an example, to map real space may include to use a SLAM technique.

The technique 600 includes an operation 606 to determine an orientation of an image capture device relative to a static portion of the user, using the image. In an example, the static portion may include a torso of the user. In another example, detecting movement of the device includes detecting movement of the device using an accelerometer. In an example, detecting movement of the device includes detecting movement of the device without detecting movement of the device relative to the static portion of the user. For example, the device may determine that the static portion has not moved while the device has moved. In an example, determining the orientation may include creating a three-dimensional model of the torso and determining an average location of the three-dimensional model. In another example, determining the orientation may include determining edges of shoulders of the torso. In yet another example, determining the orientation may include determining a second orientation of a head relative to a torso using a sensor. Determining the orientation may include using a sensor attached to the static portion of the user.

To determine a static portion of a user may include using skin tone and a depth camera to determine a point below a chin of the user, such as where the torso meets the neck. In another example, a point on a shirt of the user, such as a deliberate landmark on a shirt may be used to determine the static portion. For example, an augmented reality tag, which is similar to a QR code, but used for augmented reality may allow the camera to determine the position and orientation relative to the augmented reality tag. In another example, inertial sensors worn by the user may be used, which report where the user is relative to gravity and Earth's magnetic field. The inertial sensors may be used with the camera and an accelerometer to determine the position of the camera relative to the user. Additionally, a time of flight or received signal strength indicator may be used to determine a distance from the camera to the user. In the examples where a sensor on the user's torso is used, the sensor may be located anywhere on the torso, such as on the back of the torso, on a belt, etc.

The technique 600 includes an operation 608 to display a virtual reality image using the orientation. Operation 608 may include displaying a first portion of the virtual reality image on a display screen of the device, and in response to detecting movement of the device, moving the virtual reality image on the display screen to display a second portion using the orientation of the device relative to the static portion of the user. The virtual reality image may include an augmented reality image.

Figure 7:
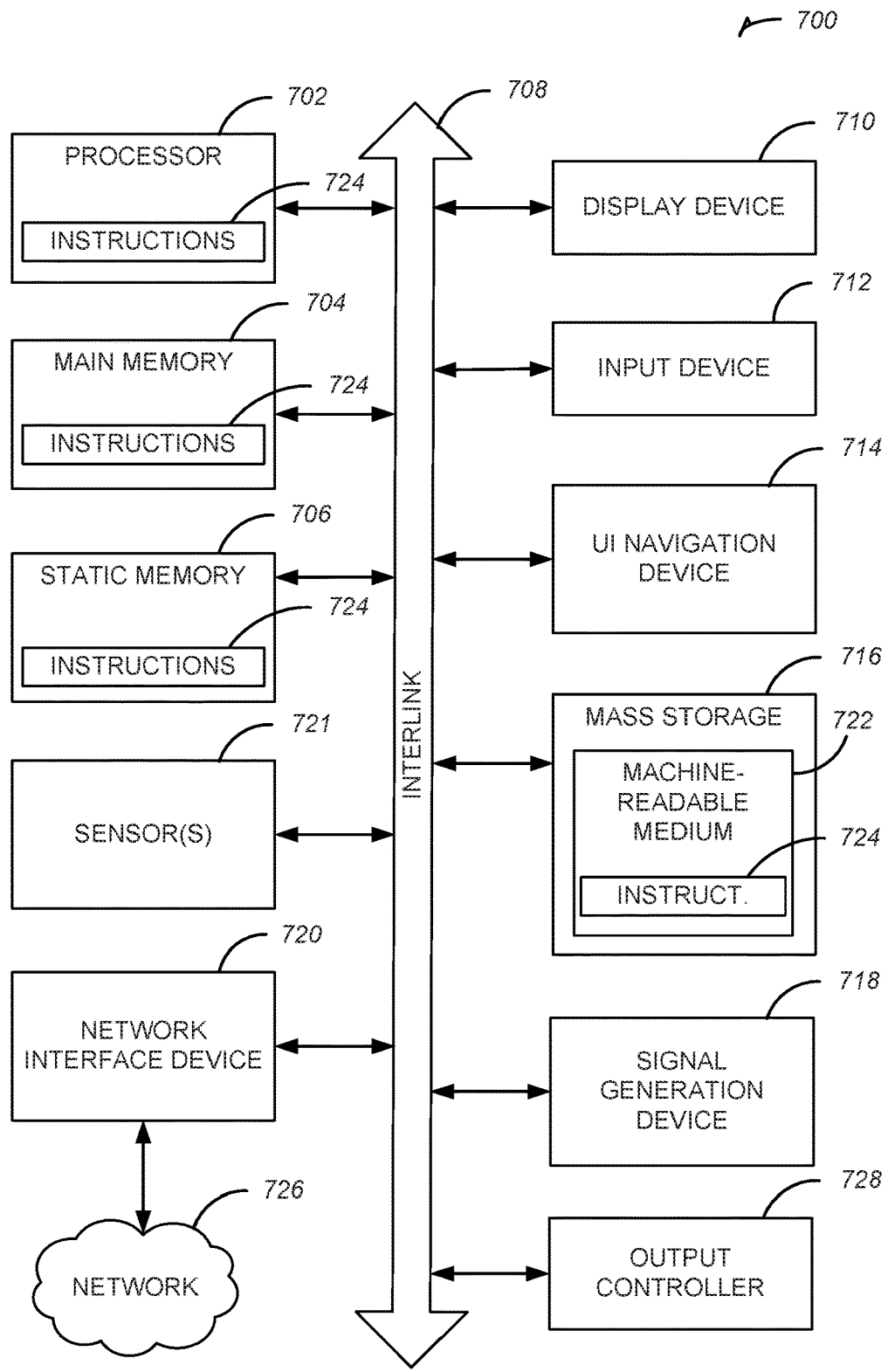
FIG. 7 illustrates generally an example of a block diagram of a machine upon which any one or more of the techniques (e.g., methodologies) discussed herein may perform in accordance with some embodiments.

FIG. 7 illustrates generally an example of a block diagram of a machine 700 upon which any one or more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, alphanumeric input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, magnetometer, camera, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 that is non-transitory on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a method for displaying virtual reality, the method comprising: capturing, at a device, an image of a user using a camera of the device; mapping real space that is visible to the camera using the image; determining a first orientation of the device relative to a static portion of the user using the image; displaying a first portion of a virtual reality image on a display screen of the device; and in response to determining a second orientation of the device relative to the static portion of the user, displaying a second portion of the virtual reality image on the display screen.

In Example 2, the subject matter of Example 1 optionally includes, wherein the portion of the user is a torso captured in the image.

In Example 3, the subject matter of Example 2 optionally includes, wherein determining the first orientation includes creating a three-dimensional model of the torso and determining a location and orientation of the three-dimensional model of the torso relative to the display.

In Example 4, the subject matter of Example 3 optionally includes, wherein determining the first orientation includes determining edges of shoulders of the torso.

In Example 5, the subject matter of any one or more of Examples 1-4 optionally include, wherein the device is a mobile device.

In Example 6, the subject matter of any one or more of Examples 1-5 optionally include, wherein the device includes virtual reality glasses.

In Example 7, the subject matter of Example 6 optionally includes, wherein determining the first orientation includes determining a third orientation of a head relative to a torso using a sensor.

In Example 8, the subject matter of any one or more of Examples 1-7 optionally include, wherein capturing the image of the user includes capturing the image with a wide-angle camera.

In Example 9, the subject matter of any one or more of Examples 1-8 optionally include, wherein capturing the image of the user includes capturing the picture using a depth camera.

In Example 10, the subject matter of any one or more of Examples 1-9 optionally include, wherein mapping real space and determining the first orientation of the device include using simultaneous location and mapping.

In Example 11, the subject matter of any one or more of Examples 1-10 optionally include, wherein determining the first orientation includes using a sensor attached to the static portion of the use In Example 12, the subject matter of any one or more of Examples 1-11 optionally include, wherein determining the first orientation of the device relative to the static portion of the user includes determining the first orientation using an accelerometer.

In Example 13, the subject matter of any one or more of Examples 1-12 optionally include, wherein the device includes virtual reality goggles.

Example 14, includes at least one machine-readable medium including instructions for receiving information, which when executed by a machine, cause the machine to perform any of the methods of Examples 1-13.

Example 15 includes an apparatus comprising means for performing any of the methods of Examples 1-13.

Example 16 is at least one machine readable medium including instructions that, when executed, cause the machine to perform operations for displaying virtual reality, the operations comprising: capturing, at a device, an image of a user using a camera of the device; mapping real space that is visible to the camera using the image; determining a first orientation of the device relative to a static portion of the user using the image; displaying a first portion of a virtual reality image on a display screen of the device; and in response to determining a second orientation of the device relative to the static portion of the user, displaying a second portion of the virtual reality image on the display screen.

In Example 17, the subject matter of Example 16 optionally includes, wherein the portion of the user is a torso captured in the image.

In Example 18, the subject matter of Example 17 optionally includes, wherein determining the first orientation includes creating a three-dimensional model of the torso and determining a location and orientation of the three-dimensional model of the torso relative to the display.

In Example 19, the subject matter of Example 18 optionally includes, wherein determining the first orientation includes determining edges of shoulders of the torso.

In Example 20, the subject matter of any one or more of Examples 16-19 optionally include, wherein the device includes virtual reality goggles.

In Example 21, the subject matter of any one or more of Examples 16-20 optionally include, wherein the device is a mobile device.

In Example 22, the subject matter of any one or more of Examples 16-21 optionally include, wherein the device includes virtual reality glasses.

In Example 23, the subject matter of Example 22 optionally includes, wherein determining the orientation includes determining a third orientation of a head relative to a torso using a sensor.

In Example 24, the subject matter of any one or more of Examples 16-23 optionally include, wherein capturing the image of the user includes capturing the image with a wide-angle camera.

In Example 25, the subject matter of any one or more of Examples 16-24 optionally include, wherein capturing the image of the user includes capturing the picture using a depth camera.

In Example 26, the subject matter of any one or more of Examples 16-25 optionally include, wherein mapping real space and determining the orientation of the device include using simultaneous location and mapping.

In Example 27, the subject matter of any one or more of Examples 16-26 optionally include, wherein determining the first orientation includes using a sensor attached to the static portion of the user.

In Example 28, the subject matter of any one or more of Examples 16-27 optionally include, wherein determining the first orientation of the device relative to the static portion of the user includes determining the first orientation using an accelerometer.

Example 29 is a device for displaying virtual reality, the device comprising: a camera to: capture an image of a user; processing circuitry to: map real space that is visible to the camera using the image; determine a first orientation of the device relative to a static portion of the user using the image; and a display device to: display a first portion of a virtual reality image on a display screen of the device; and display, in response to the processing circuitry determining a second orientation of the device relative to the static portion of the user, a second portion of the virtual reality image on the display screen.

In Example 30, the subject matter of Example 29 optionally includes, wherein the portion of the user is a torso captured in the image.

In Example 31, the subject matter of Example 30 optionally includes, wherein to determine the orientation, the processing circuitry is to create a three-dimensional model of the torso and determine a location and orientation of the three-dimensional model of the torso relative to the display.

In Example 32, the subject matter of Example 31 optionally includes, wherein to determine the orientation, the processing circuitry is to determine edges of shoulders of the torso.

In Example 33, the subject matter of any one or more of Examples 29-32 optionally include, wherein the device is a mobile device.

In Example 34, the subject matter of any one or more of Examples 29-33 optionally include, wherein the device includes virtual reality glasses.

In Example 35, the subject matter of any one or more of Examples 29-34 optionally include, wherein the device includes virtual reality goggles.

In Example 36, the subject matter of Example 35 optionally includes, wherein to determine the first orientation, the processing circuitry is to determine a third orientation of a head relative to a torso using a sensor.

In Example 37, the subject matter of any one or more of Examples 29-36 optionally include, wherein the camera is a wide-angle camera.

In Example 38, the subject matter of any one or more of Examples 29-37 optionally include, wherein the camera is a depth camera.

In Example 39, the subject matter of any one or more of Examples 29-38 optionally include, wherein to map real space and determine the first orientation of the device, the processing circuitry is to use simultaneous location and mapping.

In Example 40, the subject matter of any one or more of Examples 29-39 optionally include, wherein to determine the first orientation, the processing circuitry is to use a sensor attached to the static portion of the user.

In Example 41, the subject matter of any one or more of Examples 29-40 optionally include, further comprising an accelerometer, and wherein to determine the first orientation of the device relative to the static portion of the user, the processing circuitry is to determine the first orientation using the accelerometer.

Example 42 is an apparatus for displaying virtual reality, the apparatus comprising: means for capturing, at a device, an image of a user using a camera of the device; means for mapping real space that is visible to the camera using the image; determining a first orientation of the device relative to a static portion of the user using the image; means for displaying a first portion of a virtual reality image on a display screen of the device; and in response to determining a second orientation of the device relative to the static portion of the user, means for displaying a second portion of the virtual reality image on the display screen.

In Example 43, the subject matter of Example 42 optionally includes, wherein the portion of the user is a torso captured in the image.

In Example 44, the subject matter of Example 43 optionally includes, wherein the means for determining the first orientation include means for creating a three-dimensional model of the torso and determining a location and orientation of the three-dimensional model of the torso relative to the display.

In Example 45, the subject matter of Example 44 optionally includes, wherein the means for determining the first orientation include means for determining edges of shoulders of the torso.

In Example 46, the subject matter of any one or more of Examples 42-45 optionally include, wherein the device is a mobile device.

In Example 47, the subject matter of any one or more of Examples 42-46 optionally include, wherein the device includes virtual reality glasses.

In Example 48, the subject matter of Example 47 optionally includes, wherein the means for determining the first orientation include means for determining a third orientation of a head relative to a torso using a sensor.

In Example 49, the subject matter of any one or more of Examples 42-48 optionally include, wherein the means for capturing the image of the user include means for capturing the image with a wide-angle camera.

In Example 50, the subject matter of any one or more of Examples 42-49 optionally include, wherein the means for capturing the image of the user include means for capturing the picture using a depth camera.

In Example 51, the subject matter of any one or more of Examples 42-50 optionally include, wherein the means for mapping real space and determining the first orientation of the device include means for using simultaneous location and mapping.

In Example 52, the subject matter of any one or more of Examples 42-51 optionally include, wherein the means for determining the first orientation include means for using a sensor attached to the static portion of the user.

In Example 53, the subject matter of any one or more of Examples 42-52 optionally include, wherein the means for determining the first orientation of the device relative to the static portion of the user include means for determining the first orientation using an accelerometer.

In Example 54, the subject matter of any one or more of Examples 42-53 optionally include, wherein the device includes virtual reality goggles.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A device to display virtual reality, the device comprising:
   a camera to:
      capture an image of a user;
   processing circuitry to:
      map real space that is visible to the camera using the image;
      determine a first relative orientation between the device and a static portion of the user using the image; and
      determine that the first relative orientation is maintained while a position of the device and the user together changes relative to a fixed object;
   a display device to:
      display a first portion of a virtual reality image on a display screen of the device;
      maintain display of the first portion of the virtual reality image in response to the processing circuitry determining that the first relative orientation is maintained while the position of the device and the user together changes relative to the fixed object; and
      display, in response to the processing circuitry determining a second relative orientation between the device and the static portion of the user, a second portion of the virtual reality image on the display screen, wherein a third relative orientation between a head of the user and the device is maintained from the first relative orientation to the second relative orientation.

2. The device of claim 1, wherein the portion of the user is a torso captured in the image.

3. The device of claim 2, wherein to determine the orientation, the processing circuitry is to create a three-dimensional model of the torso and determine a location and orientation of the three-dimensional model of the torso relative to the display.

4. The device of claim 2, wherein to determine the orientation, the processing circuitry is to determine edges of shoulders of the torso.

5. The device of claim 1, wherein the device includes virtual reality glasses.

6. The device of claim 1, further comprising an accelerometer, and wherein to determine the first orientation of the device relative to the static portion of the user, the processing circuitry is to determine the first orientation using the accelerometer.

7. A method for displaying virtual reality, the method comprising:
    capturing, at a device, an image of a user using a camera of the device;
    mapping real space that is visible to the camera using the image;
    determining a first relative orientation between the device and a static portion of the user using the image;
    displaying a first portion of a virtual reality image on a display screen of the device;
    determining that the first relative orientation is maintained while a position of the device and the user together changes relative to a fixed object:
    maintaining display of the first portion of the virtual reality image in response to determining that the first relative orientation is maintained while the position of the device and the user together changes relative to the fixed object; and
    in response to determining a second relative orientation between the device and the static portion of the user, displaying a second portion of the virtual reality image on the display screen, wherein a third relative orientation between a head of the user and the device is maintained from the first relative orientation to the second relative orientation.

8. The method of claim 7, wherein the portion of the user is a torso captured in the image.

9. The method of claim 8, wherein determining the first orientation includes creating a three-dimensional model of the torso and determining a location and orientation of the three-dimensional model of the torso relative to the display.

10. The method of claim 9, wherein determining the first orientation includes determining edges of shoulders of the torso.

11. The method of claim 7, wherein the device is a mobile device.

12. The method of claim 7, wherein the device includes virtual reality glasses.

13. The method of claim 12, wherein determining the first orientation includes determining a third orientation of a head relative to a torso using a sensor.

14. The method of claim 7, wherein capturing the image of the user includes capturing the image with a wide-angle camera.

15. The method of claim 7, wherein capturing the image of the user includes capturing the picture using a depth camera.

16. The method of claim 7, wherein mapping real space and determining the first orientation of the device include using simultaneous location and mapping.

17. The method of claim 7, wherein determining the first orientation includes using a sensor attached to the static portion of the user.

18. The method of claim 7, wherein determining the first orientation of the device relative to the static portion of the user includes determining the first orientation using an accelerometer.

19. At least one non-transitory machine readable medium including instructions that, when executed, cause the machine to perform operations for displaying virtual reality, the operations comprising:
    capturing, at a device, an image of a user using a camera of the device;
    mapping real space that is visible to the camera using the image;
    determining a first relative orientation between the device and a static portion of the user using the image;
    displaying a first portion of a virtual reality image on a display screen of the device;
    determine that the first relative orientation is maintained while a position of the device and the user together changes relative to a fixed object:
    maintain display of the first portion of the virtual reality image in response to determining that the first relative orientation is maintained while the position of the device and the user together changes relative to the fixed object; and
    in response to determining a second relative orientation between the device and the static portion of the user, displaying a second portion of the virtual reality image on the display screen, wherein a third relative orientation between a head of the user and the device is maintained from the first relative orientation to the second relative orientation.

20. The at least one machine readable medium of claim 19, wherein the portion the user is a torso captured in the image.

21. The at least one machine readable medium of claim 20, wherein determining the first orientation includes creating a three-dimensional model of the torso and determining a location and orientation of the three-dimensional model of the torso relative to the display.

22. The at least one machine readable medium of claim 20, wherein determining the first orientation includes determining edges of shoulders of the torso.

23. The at least one machine readable medium of claim 19, wherein the device includes virtual reality goggles.

24. The at least one machine readable medium of claim 19, wherein determining the first orientation includes determining a second orientation of a head relative to a torso using a sensor.

* * * * *